United States Patent

Lorenz et al.

[11] 4,017,609
[45] Apr. 12, 1977

[54] O-ALKYL-O-[7-NITROBENZISOXAZOL(-3)YL]-THIONOPHOSPHORIC (PHOSPHONIC) ACID ESTERS

[75] Inventors: Walter Lorenz, Wuppertal; Ingeborg Hammann, Cologne; Wilhelm Stendel, Wuppertal, all of Germany

[73] Assignee: Bayer Aktiengesellschaft, Leverkusen, Germany

[22] Filed: Dec. 8, 1975

[21] Appl. No.: 638,876

[30] Foreign Application Priority Data

Dec. 11, 1974 Germany .................. 2458626

[52] U.S. Cl. .................. 424/200; 260/307 DA
[51] Int. Cl.² .................. C07D 261/20
[58] Field of Search .............. 260/307 DA; 424/200

[56] References Cited

FOREIGN PATENTS OR APPLICATIONS 965,997   8/1964   United Kingdom

Primary Examiner—Raymond V. Rush
Attorney, Agent, or Firm—Burgess, Dinklage & Sprung

[57] ABSTRACT

O-Alkyl-O-[7-nitrobenzisoxazol(3)yl]-thionophosphoric (phosphonic) acid esters of the formula

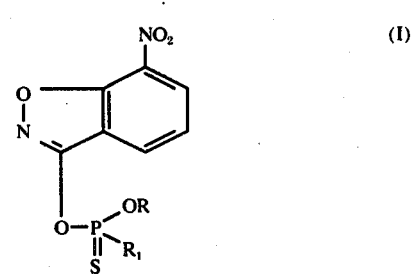

in which
R is alkyl with 1 to 6 carbon atoms, and
$R_1$ is alkyl or alkoxy with 1 to 6 carbon atoms, or phenyl,
which possess insecticidal and acaricidal properties.

8 Claims, No Drawings

O-ALKYL-O-[7-NITROBENZISOXAZOL(3)YL]-THIONOPHOSPHORIC (PHOSPHONIC) ACID ESTERS

The present invention relates to and has for its objects the provision of particular new O-alkyl-O-[7-nitrobenzisoxazol-(3)yl]-thionophosphoric (phosphonic) acid esters, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It has been disclosed in British Patent Specification No. 965,997 that benzisoxazolothionophosphoric acid esters and -phosphonic acid esters, for example O,O-diethyl-O-[5-nitro- (Compound A) or 6-nitrobenzisoxazol(3)yl]-thionophosphoric acid ester (Compound B) or O-ethyl-O-[5-nitro-benzisoxazol-(3)yl]-thionoethanephosphonic acid ester (Compound C), exhibit an insecticidal and acaricidal action.

The present invention now provides, as new compounds, the benzisoxazolothionophosphoric(phosphonic) acid esters of the general formula

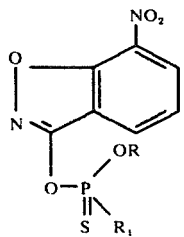

(I)

in which
R is alkyl with 1 to 6 carbon atoms, and
$R_1$ is alkyl or alkoxy with in either case 1 to 6 carbon atoms, or phenyl.

Preferably $R_1$ is straight-chain or branched alkyl or alkoxy with 1 to 4, especially 1 to 3, carbon atoms, or phenyl, and R is straight-chain or branched alkyl with 1 to 4 carbon atoms.

Surprisingly, the benzisoxazolothiono-phosphoric(phosphonic) acid esters according to the invention exhibit a substantially better insecticidal and acaricidal action than the known benzisoxazolothiono-phosphoric acid esters of analogous structure and of the same type of action. The compounds according to the invention thus represent a genuine enrichment of the art.

The invention also provides a process for the preparation of a benzisoxazolothionophosphoric(phosphonic) acid ester of the formula (I) in which 3-hydroxy-7-nitro-benzisoxazole of the general formula

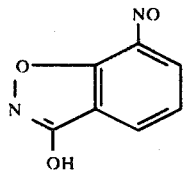

(II)

is reacted, in the presence of an acid acceptor or in the form of an alkali metal salt, alkaline earth metal salt or ammonium salt thereof, with a thionophosphoric(phosphonic) acid esterhalide of the general formula

(III), in which
R and $R_1$ have the above-mentioned meanings, and
Hal is halogen, preferably chlorine.

If O,O-diethylthionophosphoric acid ester chloride and 3-hydroxy-7-nitro-benzisoxazole are used as starting materials, the course of the reaction can be represented by the following equation:

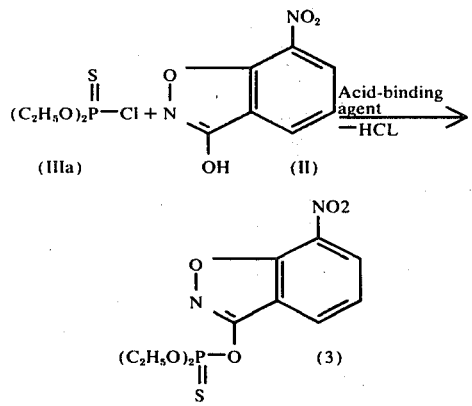

The thionophosphoric(phosphonic) acid esters required as starting materials are known and can be prepared according to customary processes, as can the 3-hydroxy-7-nitro-benzisoxazole (II) (see Chem. Ber. 100, 954–960 [1967]).

The following may be mentioned as examples of the thionophosphoric(phosphonic) acid ester halides (III) which can be used as starting materials: O,O-dimethyl-, O,O-diethyl-, O,O-di-n-propyl-, O,O-di-isopropyl-, O-methyl-O-ethyl-, O-methyl-O-isopropyl-, O-ethyl-O-isopropyl-, O-methyl-O-n-butyl-, O,O-di-n-butyl-, O,O-di-disobutyl-, O,O-di-n-sec.-butyl-, O,O-di-tert.-butyl-, O-n-butyl-O-ethyl, O-sec.-butyl-O-ethyl- or O-n-butyl-O-n-propyl-thionophosphoric acid diester chloride, and also O-methyl-methane, O-methyl-ethane-, O-methyl-n-propane-, O-methyl-isopropane-, O-methyl-n-butane-, O-methyl-sec.-butane-, O-methyl-isobutane-, O-methyl-tert.-butane-, O-methyl-benzene, O-ethyl-methane, O-ethyl-ethane-, O-ethyl-n-propane-, O-ethyl-isopropane-, O-ethyl-n-butane-, O-ethyl-isobutane-, O-ethyl-tert.-butane-, O-ethyl-sec.-butane-, O-n-propyl-methane, O-n-propyl-ethane-, O-n-propyl-n-propane-, O-n-propyl-isopropane-, O-n-propyl-n-butane-, O-n-propyl-isobutane-, O-n-propyl-sec.-butane-, O-n-propyl-tert.-butane-, O-isopropyl-methane-, O-isopropyl-ethane-, C-isopropyl-n-propane-, O-isopropyl-isopropane-, O-isopropyl-n-butane-, O-isopropyl-tert.-butane-, O-isopropylphenyl-, O-n-butyl-methane-, O-n-butyl-ethane-, O-n-butylsec.-butane-, O-n-butyl-phenyl-, O-tert,-butyl-ethane-, O-tert.-butyl-n-propane- or O-tert.-butyl-benzene-thionophosphonic acid ester chloride.

The preparative process is preferably carried out in the presence of suitable solvents or diluents. As such, practically all inert organic solvents can be used, especially aliphatic and aromatic, optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, for example acetone, methyl ethyl ketone, methyl isopropyl ketone and methyl isobutyl ketone; and nitriles, such as acetonitrile and propionitrile.

All customary acid-binding agents can be used as acid acceptors. Alkali metal carbonates and alkali metal alcoholates, such as sodium carbonate and potassium carbonate, sodium methylate and ethylate and potassium methylate, ethylate and tert.-butylate, have proved particularly suitable, as have aliphatic, aromatic or heterocyclic amines, for example triethylamine, trimethylamine, dimethylaniline, dimethylbenzylamine and pyridine.

The reaction temperature can be varied within a fairly wide range. In general, the reaction is carried out at between 0° and 120° C, preferably at from 40° to 60° C.

The reaction is in general allowed to take place under normal pressure.

To carry out the process, the benzisoxazole reagent is preferably employed in a 10–20% excess. The reaction is preferably carried out in one of the stated solvents, in the presence of an acid acceptor, in most cases at elevated temperatures. After completion of the reaction, the reaction mixture is cooled, poured into water and extracted by shaking with an organic solvent. The organic phase is washed and dried and the solvent is distilled off in vacuo.

The new compounds are frequently obtained in the form of oils which in most cases cannot be distilled without decomposition, but are freed from the last volatile constituents by so-called "slight distillation," that is to say by prolonged heating under reduced pressure to moderately elevated temperatures, and are purified in this way. They are characterized by the refractive index. If the compounds are obtained in crystalline form, they are characterized by their melting point.

As has already been mentioned, the benzisoxazolothionophosphoric(phosphonic) acid esters according to the invention are distinguished by an outstanding insecticidal and acaricidal activity. They are active not only against plant pests, pests harmful to health and pests of stored products but also, in the veterinary medicine field, against animal parasites (ectoparasites), such as parasitic fly larvae. They combine a low phytotoxicity with a good action against both sucking and biting insects and against mites. Some of the compounds also possess a fungicidal activity.

For this reason, the compounds according to the invention can be employed successfully as pesticides in plant protection and in the hygiene field, the field of protection of stored products and the veterinary field.

The active compounds according to the invention are well tolerated by plants and have a favorable level of toxicity to warm-blooded animals, and can be used for combating all or individual, including the pre-embryonic, normally sensitive and resistant, stages of development of insects and arthropods where these are known as pests in agriculture, in forestry, in the protection of stored products and in the protection of materials, as well as in hygiene.

When used against pests harmful to health and pests of stored products, the active compounds are distinguished by an excellent residual action on wood and clay, as well as a good stability to alkali on limed substrates.

The economically important pests in agriculture and forestry, as well as pests of stored products, pests destructive of materials and pests harmful to health, include: from the order of the *Isopoda*, for example, *Oniscus asellus*, *Armadillidium vulgare* and *Porcellio scaber;* from the order of the *Diplopoda*, for example, *Blaniulus guttulatus;* from the order of the *Chilopoda*, for example, *Geophilus carpophagus* and *Scutigera* spec.; from the order of the *Symphyla*, for example, *Scutigerella immaculata;* from the order of the *Arachnida*, for example, *Scorpio maurus* and *Latrodectus mactans;* from the order of the *Acarina*, for example, *Acarus siro*, *Argas reflexus*, *Ornithodoros moubata*, *Dermanyssus gallinae*, *Eriophyes ribis*, *Phyllocoptruta oleivora*, *Boophilus microplus*, *Rhipicephalus evertsi*, *Sarcoptes scabiei*, *Tarsonemus* spec., *Bryobia praetiosa*, *Panonychus citri*, *Panonychus ulmi*, *Tetranychus tumidus* and *Tetranychus urticae;* from the order of the *Thysanura*, for example, *Lepisma saccharina;* from the order of the *Collembola*, for example, *Onychiurus armatus;* from the order of the *Orthoptera*, for example, *Blatta orientalis*, *Periplaneta americana*, *Leucophaea maderae*, *Blattella germanica*, *Acheta domesticus*, *Gryllotalpa* spec., *Locusta migratoria migratorioides*, *Melanoplus differentialis* and *Schistocerca gregaria;* from the order of the *Dermaptera*, for example *Forficula auricularia;* from the order of the *Isoptera*, for example, *Reticulitermes* spec.; from the order of the *Anoplura*, for example, *Phylloxera vastatrix*, *Pemphigus* spec. and *Pediculus humanus corporis;* from the order of the *Thysanoptera*, for example, *Hercinothrips femoralis* and *Thrips tabaci;* from the order of the *Heteroptera*, for example, *Eurygaster* spec., *Dysdercus intermedius*, *Piesma quadrata*, *Cimex lectularius*, *Rhodnius prolixus* and *Triatoma* spec., from the order of the *Homoptera*, for example, *Aleurodes brassicae*, *Bemisia tabaci*, *Trialeurodes vaporariorum*, *Aphis gossypii*, *Brevicoryne brassicae*, *Cryptomyzus ribis*, *Doralis fabae*, *Doralis pomi*, *Eriosoma lanigerum*, *Hyalopterus arundinis*, *Macrosiphum avenae*, *Myzus cerasi*, *Myzus persicae*, *Phorodon humuli*, *Rhopalosiphum padi*, *Empoasca* spec., *Euscelis bilobatus*, *Nephotettix cincticeps*, *Lecanium corni*, *Saissetia oleae*, *Laodelphax striatellus*, *Nilaparvata lugens*, *Aonidiella aurantii*, *Aspidiotus hederae*, *Pseudococcus* spec. and *Psylla* spec., from the order of the *Lepidoptera*, for example, *Pectinophora gossypiella*, *Bupalus piniarius*, *Cheimatobia brumata*, *Lithocolletis blancardella*, *Hyponomeuta padella*, *Plutella maculipennis*, *Malacosoma neustria*, *Euproctis chrysorrhoea*, *Lymantria* spec., *Bucculatrix thurberiella*, *Phyllocnistis citrella*, *Agrotis* spec., *Euxoa* spec., *Feltia* spec., *Earias insulana*, *Heliothis* spec., *Laphygma exigua*, *Mamestra brassicae*, *Panolis flammea*, *Prodenia litura*, *Spodoptera* spec., *Trichoplusia ni*, *Carpocapsa pomonella*, *Pieris* spec., *Chilo* spec., *Pyrausta nubilalis*, *Ephestia kuhniella*, *Galleria mellonella*, *Cacoecia podana*, *Capua reticulana*, *Choristoneura fumiferana*, *Clysia ambiguella*, *Homona magnanima* and *Tortrix viridana;* from the order of the *Coleoptera*, for example, *Anobium punctatum*, *Rhizopertha dominica*, *Bruchidius obtectus*, *Acanthoscelides obtectus*, *Hylotrupes bajulus*, *Agelastica*

*alni, Leptinotarsa decemlineata, Phaedon cochleariae, Diabrotica* spec., *Psylliodes chrysocephala, Epilachna varivestis, Atomaria* spec., *Oryzaephilus surinamensis, Anthonomus* spec., *Sitophilus* spec., *Otiorrhynchus sulcatus, Cosmopolites sordidus, Ceuthorrhynchus assimilis, Hypera postica, Dermestes* spec., *Trogoderma* spec., *Anthrenus* spec., *Attagenus* spec., *Lyctus* spec., *Meligethes aeneus, Ptinus* spec., *Niptus hololeucus, Gibbium psylloides, Tribolium* spec., *Tenebrio molitor, Agriotes* spec., *Conoderus* spec., *Melolontha melolontha, Amphimallus solstitialis* and *Costelytra zealandica;* from the order of the *Hymenoptera,* for example, *Diprion* spec., *Hoplocampa* spec., *Lasius* spec., *Monomorium pharaonis* and *Vespa* spec.; from the order of the *Diptera,* for example, *Aedes* spec., *Anopheles* spec., *Culex* spec., *Drosophila melanogaster, Musca domestica, Fannia* spec., *Stomoxys calcitrans, Hypoderma* spec., *Bibio hortulanus, Oscinella frit, Phorbia* spec., *Pegomyia hyoscyami, Calliphora erythrocephala, Lucilia* spec., *Chrysomyia* spec., *Ceratitis capitata, Dacus oleae* and *Tipula paludosa;* and from the order of the *Siphonaptera,* for example, *Xenopsylla cheopis.*

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes, (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or nematocides, fungicides, bactericides, rodenticides, herbicides, fertilizers, growth-regulating agents, etc., if desired, or in the form of particular dosage preparations for specific application made therefrom, such as solutions, emulsions, suspensions, powders, pastes, granules, very fine capsules in polymeric substances and in coating compositions suited for use on seed, and fumigating cartridges.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water, preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, e.g. to a growing crop, to an area where a crop is to be grown or to a domestic animal, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Tetranychus test (resistant)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10–30 cm, were sprayed with the preparation of the active compound until dripping wet. These bean plants were heavily infested with the two-spotted spider mite (*Tetranychus urticae*) in all stages of development.

After the specified periods of time, the degree of destruction was determined as a percentage: 100% means that all the spider mites were killed whereas 0% means that none of the spider mites were killed.

The active compounds, the concentrations of the active compounds, the evaluation times and the results can be seen from the following table:

Table 1

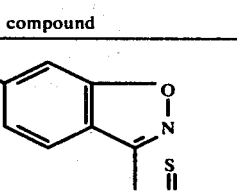

Table 1-continued

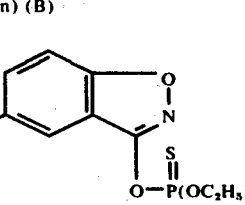

EXAMPLE 2

Plutella test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100% means that all the caterpillars were killed whereas 0% means that none of the caterpillars were killed.

The active compounds, the concentrations of the active compounds, the evaluation times and the results can be seen from the following table:

Table 2
(Plutella test)

| Active compound | Active compound concentration in % | Degree of destruction in % after 3 days |
|---|---|---|
| 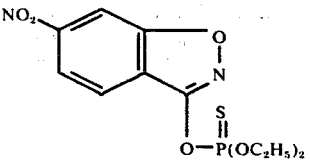 (known) (B) | 0.01<br>0.001<br>0.0001 | 100<br>85<br>0 |
| 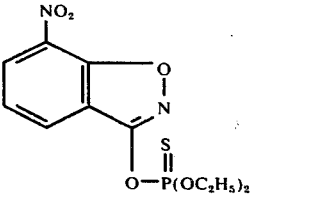 (3) | 0.01<br>0.001<br>0.0001 | 100<br>100<br>90 |

EXAMPLE 3

Phaedon larvae test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) were sprayed with the preparation of the active compound until dripping wet and were then infested with mustard beetle larvae (*Phaedon cochleariae*).

After the specified periods of time, the degree of destruction was determined in %: 100% means that all beetle larvae had been killed whereas 0% means that none of the beetle larvae had been killed.

The active compounds, the concentrations of the active compounds, the evaluation times and the results can be seen from the following table:

Table 3
(Phaedon larvae test)

| Active compound | Active compound concentration in % | Degree of destruction in % after 3 days |
|---|---|---|
| 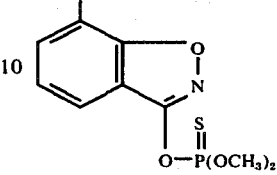 (known) (C) | 0.1<br>0.01 | 100<br>0 |
| 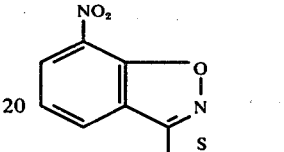 (2) | 0.1<br>0.01 | 100<br>100 |
| 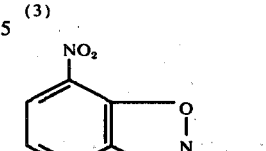 (3) | 0.1<br>0.01 | 100<br>100 |
| 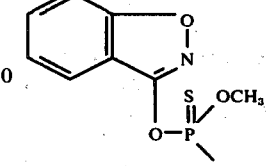 (6) | 0.1<br>0.01 | 100<br>100 |
| 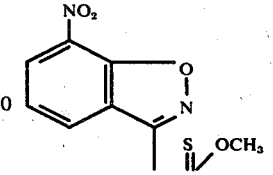 (7) | 0.1<br>0.01 | 100<br>100 |
| 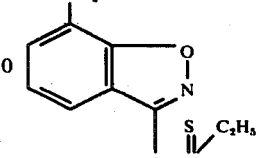 (4) | 0.1<br>0.01 | 100<br>100 |
| 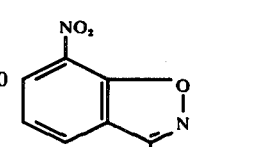 (5) | 0.1<br>0.01 | 100<br>100 |

Table 3-continued
(Phaedon larvae test)

| Active compound | Active compound concentration in % | Degree of destruction in % after 3 days |
|---|---|---|
| 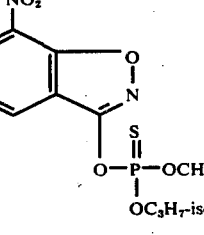 (1) | 0.1<br>0.01 | 100<br>100 |

EXAMPLE 4

Test with parasitic fly larvae
Solvent:
35 parts by weight of ethylene polyglycol monomethyl ether
35 parts by weight of nonylphenol polyglycol ether To produce a suitable preparation of active compound, 30 parts by weight of the active substance in question were mixed with the stated amount of solvent which contained the above-mentioned proportion of emulsifier and the concentrate thus obtained was diluted with water to the desired concentration.

About 20 fly larvae (*Lucilia cuprina*) were introduced into a test tube which contained approx. 2 cm³ of horse muscle. 0.5 ml of the preparation of active compound was applied to this horse meat. After 24 hours, the degree of destruction in % was determined. 100% means that all the larvae had been killed and 0% means that no larvae had been killed.

The active compounds investigated, the concentrations of the active compounds used and the results obtained can be seen from the table which follows:

Table 4
(Test with parasitic fly larvae/*Lucillia Cuprina*/resistant)

| Active compound | Active compound concentration in ppm | Degree of destruction in % |
|---|---|---|
| 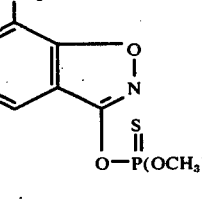 (known) (A) | 100<br>30<br>10 | 100<br><50<br>0 |
| (6) | 100<br>10<br>1 | 100<br>>50<br>0 |
| (7) | 100<br>10<br>1 | 100<br>100<br>0 |
| (2) | 100<br>30<br>10<br>3 | 100<br>100<br>100<br>0 |
| (4) | 100<br>30<br>10<br>3 | 100<br>100<br>100<br>0 |
| (1) | 100<br>10<br>1 | 100<br>100<br>0 |
| (5) | 100<br>30<br>10<br>3 | 100<br>100<br>100<br>0 |

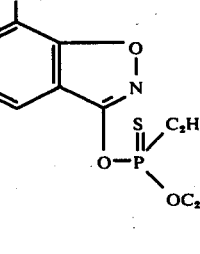
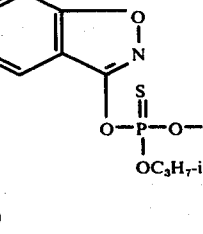
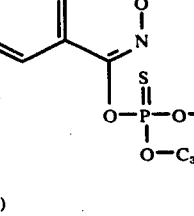

The process of the present invention is illustrated by the following preparative Examples:

EXAMPLE 5

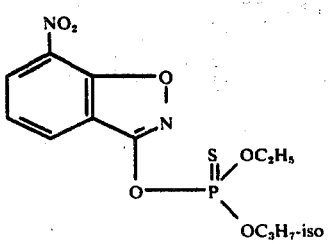 (1)

A mixture of 65 g (0.36 mole) of 3-hydroxy-7-nitrobenzisoxazole in 450 ml of acetone and 54 g (0.39 mole) of potassium carbonate was stirred for 30 minutes at 50° C. 56.5 g (0.3 mole) of O-ethyl-O-isopropyl-thionophosphoric acid diester chloride were added dropwise at 50° C, followed by 50 ml of water. The reaction mixture was warmed to 50° C for 6 hours, cooled and poured into water. The oil which separated out was taken up in toluene. The organic phase was extracted by shaking with water and then shaking twice with 2 N sodium hydroxide solution, and was finally washed with water until free from alkali. After drying over sodium sulfate, the solvent was distilled off under reduced pressure. 76 g (77% of theory) of chromatographically pure O-ethyl-O-isopropyl-O-[7-nitrobenzisoxazol(3)yl]-thionophosphoric acid ester having a refractive inded $n_D^{21}$ of 1.5183 were obtained.

The following compounds of the general formula

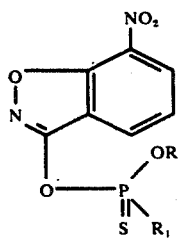 (I)

could be prepared by analogous methods:

Table 5

| Compound No. | R | $R_1$ | Yield (% of theory) | Physical data (melting point,° C, refractive index) |
|---|---|---|---|---|
| 2 | —CH₃ | —OCH₃ | 44 | 62° |
| 3 | —C₂H₅ | —OC₂H₅ | 45.5 | 58° |
| 4 | —C₂H₅ | —C₂H₅ | 47.5 | 88° |
| 5 | —C₂H₅ | —OC₃H₇-n | 43.5 | $n_D^{21}$ : 1.5422 |
| 6 | —CH₃ | —OC₃H₇-n | 45.5 | $n_D^{21}$ : 1.5484 |
| 7 | —CH₃ | —OC₃H₇-iso | 53 | $n_D^{21}$ : 1.5225 |
| 8 | —C₂H₅ | 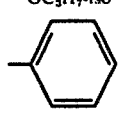 | 72 | $n_D^{21}$ : 1.6065 |

Other compounds which could be similarly prepared include:

Table 6

| Compound No. | R | $R_1$ |
|---|---|---|
| 9 | —C₃H₇-iso | —CH₃ |
| 10 | —C₃H₇-n | —C₃H₇-n |
| 11 | —C₄H₉-n | —OC₄H₉-n |

Table 6-continued

| Compound No. | R | $R_1$ |
|---|---|---|
| 12 | —C₄H₉-iso | —C₄H₉-iso |

It will be appreciated that the instant specification and examples are set forth by way of illustration and not limitation, and that various modifications and changes may be made without departing from the spirit and scope of the present invention.

What is claimed is:

1. An O-alkyl-O-[7-nitrobenzisoxazol (3)yl]-thionophosphoric(phosphonic) acid ester of the formula

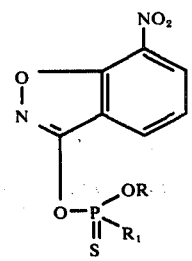

in which

R is alkyl with 1 to 6 carbon atoms, and $R_1$ is alkyl or alkoxy with 1 to 6 carbon atoms, or phenyl.

2. A compound according to claim 1, in which $R_1$ is alkyl or alkoxy with 1 to 4 carbon atoms, or phenyl, and R is alkyl with 1 to 4 carbon atoms.

3. The compound according to claim 1 wherein such compound is O-ethyl-O-isopropyl-O-[7-nitrobenzisoxazo(3)yl]-thionophosphoric acid ester of the formula

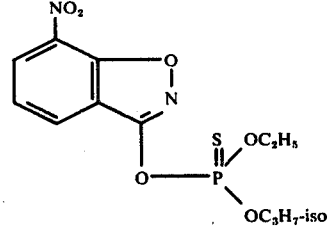

4. The compound according to claim 1 wherein such compound is O,O-diethyl-O-[7-nitrobenzisoxazol(-3)yl]-thionophosphoric acid ester of the formula

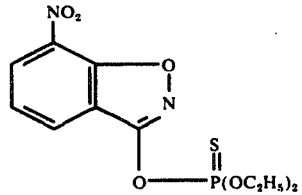

5. The compound according to claim 1 wherein such compound is O-ethyl-O-[7-nitrobenzisoxazol(3)yl]-ethanethionophosphonic acid ester of the formula

6. The compound according to claim 1 wherein such compound is O-ethyl-O-n-propyl-O-[7-nitrobenzisoxazol(3)yl]-thionophosphoric acid ester of the formula

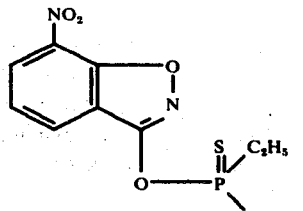

7. The compound according to claim 1 wherein such compound is O-methyl-O-isopropyl-O-[7-nitrobenzisoxazol(3)yl]-thionophosphoric acid ester of the formula

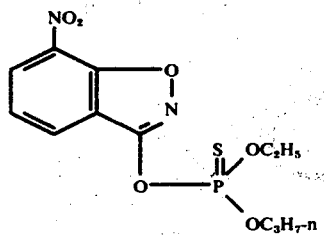

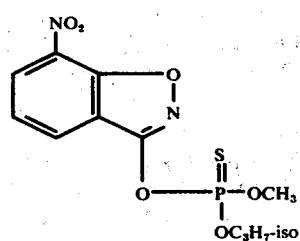

8. An insecticidal or acaricidal composition containing as active ingredient an insecticidally or acaricidally effective amount of a compound according to claim 1 in admixture with a diluent.

* * * * *